Nov. 18, 1924. H. P. MACDONALD ET AL 1,516,022
BOOK STACK
Filed Oct. 5, 1917 4 Sheets-Sheet 1

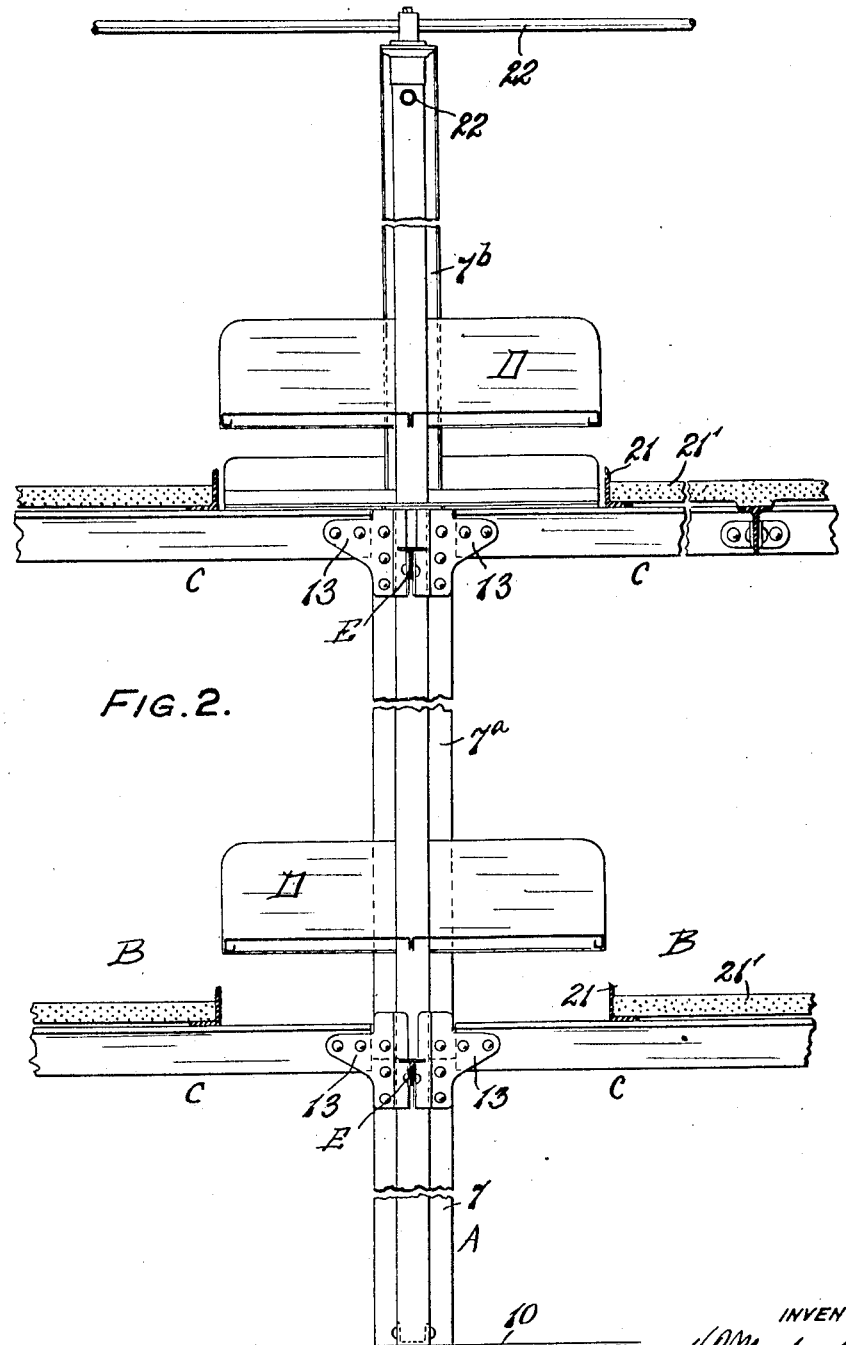

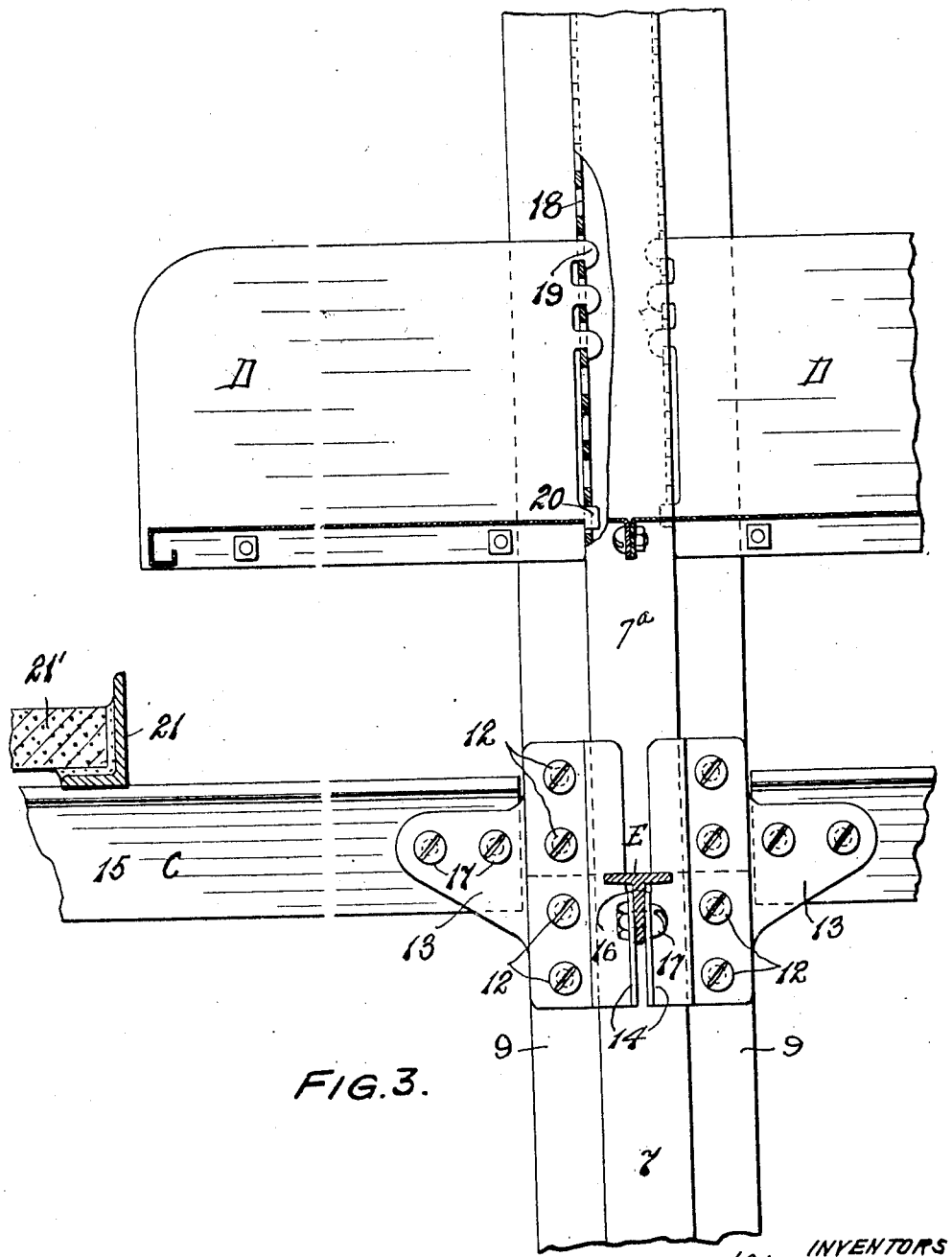

Nov. 18, 1924.

H. P. MACDONALD ET AL

BOOK STACK

Filed Oct. 5, 1917

1,516,022

4 Sheets-Sheet 4

WITNESS:

INVENTORS

ATTORNEYS

Patented Nov. 18, 1924.

1,516,022

UNITED STATES PATENT OFFICE.

HARRY P. MACDONALD, OF MONTCLAIR, NEW JERSEY, AND ANGUS S. MACDONALD, OF GREAT NECK STATION, NEW YORK, ASSIGNORS TO THE SNEAD & CO. IRON WORKS, OF JERSEY CITY, NEW JERSEY, A CORPORATION OF NEW JERSEY.

BOOKSTACK.

Application filed October 5, 1917. Serial No. 194,890.

*To all whom it may concern:*

Be it known that we, HARRY P. MACDONALD, of Montclair, county of Essex, and State of New Jersey, and ANGUS S. MACDONALD, of Great Neck Station, county of Nassau, and State of New York, have invented certain new and useful Improvements in Bookstacks, of which the following is a specification.

This invention relates to book stacks for libraries and it has for one of its primary objects the provision of a book stack structure having great latent elasticity for the purpose of resisting earthquake shocks. Another object of the invention resides in the provision of a book stack of simple construction and inherently stable independently of the library building, and which furthermore may be utilized as a means for supporting the building walls whereby lightness and economy in the building structure are obtained.

Our invention also contemplates the provision of an improved book stack structure which is stable but latently elastic and in which all of the members are so disposed that all strains and stresses are distributed at right angles whereby twisting moments are eliminated.

In addition to the foregoing our improvement resides in the provision of a book stack structure having the characteristics set forth, but in which the book space is encroached upon to a minimum extent only.

The foregoing, together with such other objects as may hereinafter appear, is accomplished by means of a construction, a preferred embodiment of which is shown in the accompanying drawings, wherein—

Figure 1:
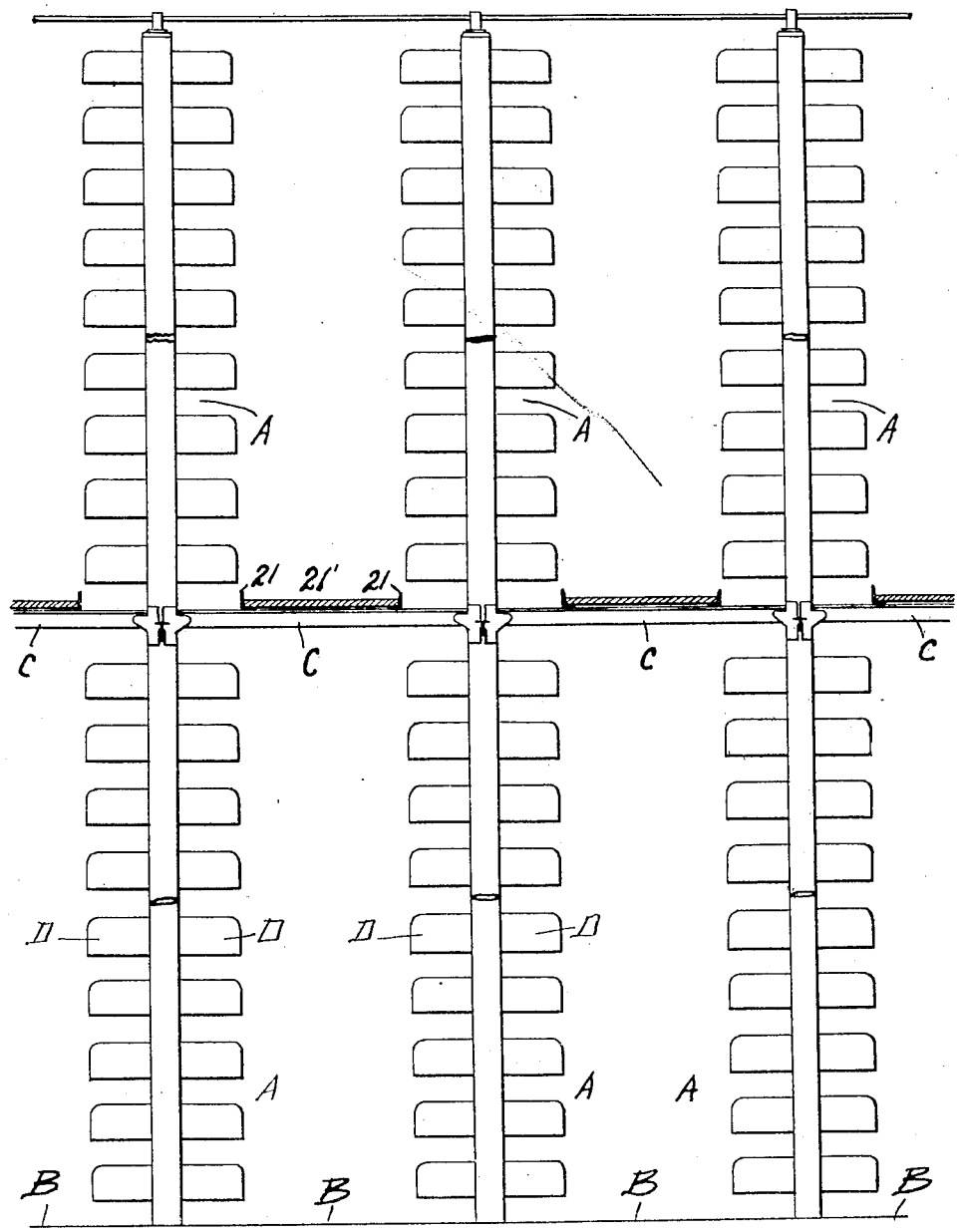
Figure 5:
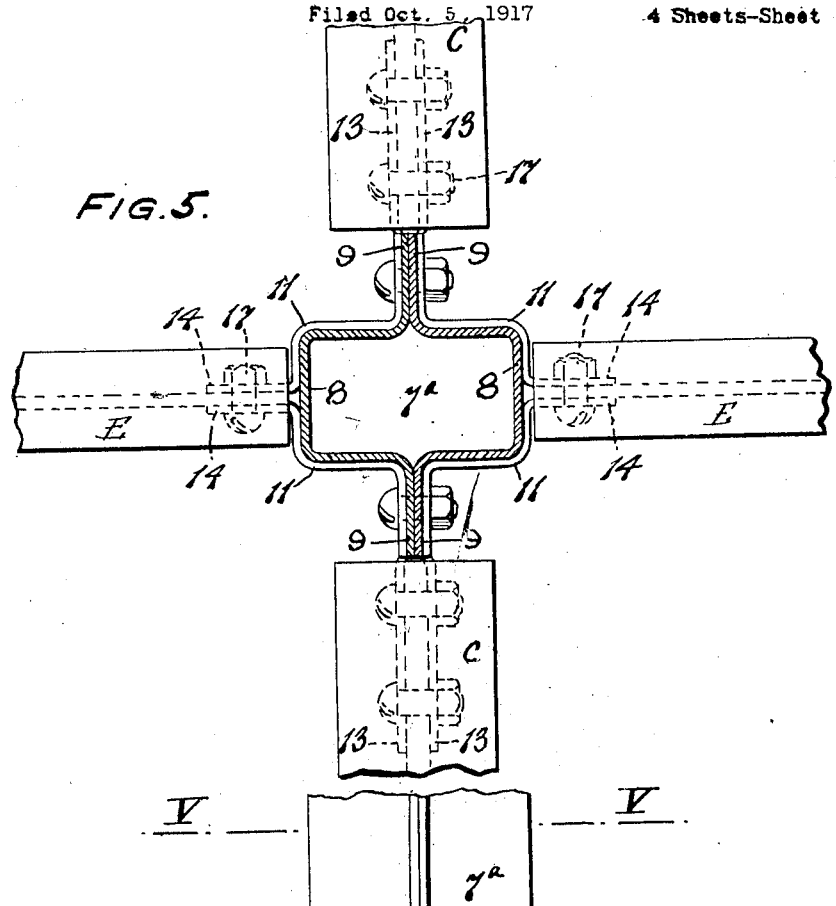
Figure 4:
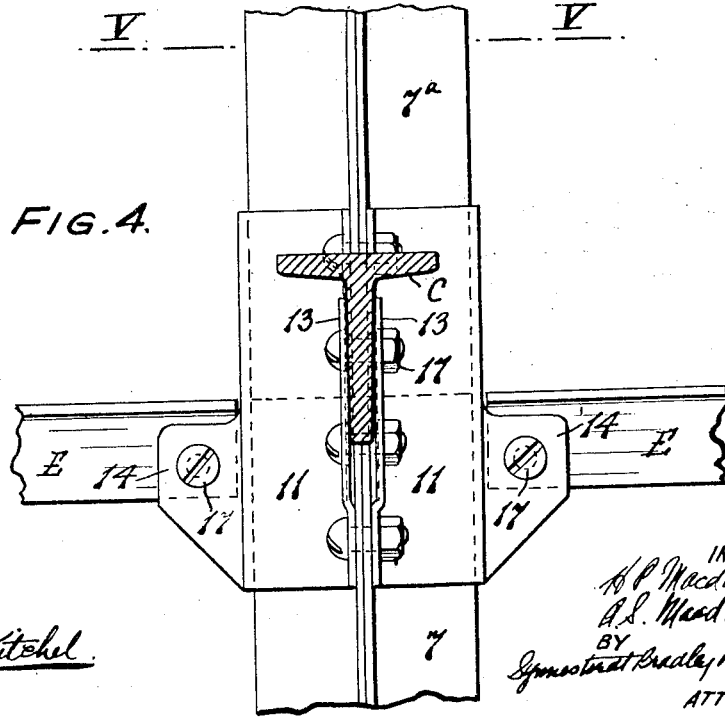

Figure 1 is a diagrammatic side elevation, partly in section and partly broken away, showing three ranges and several tiers of a stack containing our improvement; Fig. 2 is a side elevation on a larger scale showing several tiers of a typical main column in which the relation of the shelves, the deck bars and deck flooring with respect to the supporting columns is developed; Fig. 3 is a detailed view showing the column joint structure and deck bar supporting means; Fig. 4 is a sectional detail showing the column joint structure and tie bar supporting means; and Fig. 5 is a section on the line V—V of Fig. 4 showing the construction of the supporting columns and the relation of the deck bars and tie bars with respect thereto.

As shown diagrammatically in Fig. 1 the structure comprises a plurality of ranges A spaced apart to provide longitudinal aisles B, said ranges being composed of a plurality of superimposed tiers, at the levels of the joints of which are placed column-supporting deck bar structures indicated as a whole at C and to be hereinafter more specifically described. In the embodiment shown the stacks are of the double-face type, i. e., provided with book shelves D on both faces of the supporting columns, which book shelves may be of any preferred construction, although shown in the drawings as being of the detachable bracket type.

The range columns are each comprised of sections 7, 7$^a$, 7$^b$, and so forth, depending upon the number of tiers to which the structure is built up, such sections being superimposed upon one another and of substantially the same dimension, with the exception of the top section which is preferably made smaller for obvious reasons.

Each section of a range column is comprised of two sheet steel modified U-members 8 having flanges 9 placed face to face and welded together or otherwise secured. The lower sections 7 of the columns are supported on the main floor or piering 10 and splice members are provided at the section joints, such splice members comprising four bent formed quadrant gusset plates 11 with laterally projecting flanges which are secured at opposite sides of the flanges 9 of the column sections by means of bolts and nuts 12. Each gusset plate is provided at respective ends with a bracket flange or lug 13 and a bracket flange or lug 14 shown in Fig. 5 at right angles to one another. The lugs 13 are spaced apart so as to receive the vertical legs 15 of the deck bars C, and the lugs 14 are spaced apart to receive the vertical legs 16 of the tie rods E. The deck bars C and the tie rods E are secured by means of the nuts and bolts 17 between their respective lugs, the deck bars extending from column to column between respective ranges, and the tie rods extending longitudinally of the ranges from column to column of the respective range.

The hollow supporting columns have a plurality of apertures 18 in the walls thereof, such holes being adapted to receive the hooks 19 and the locking projections 20 of the bracket shelves D. Extending longitudinally of the ranges the deck bars are provided with curb angles 21 on which the deck flooring 21′ is carried. The top sections 7ᵇ of the respective columns are tied together by transverse and longitudinal tie rods 22.

The manner of assembly is as follows: the bottom sections 7 of the range columns are set up with the gusset plates 11 forming a splice for the joints in position thereon and projecting endwise therebeyond and the floor framing members or deck bars as well as the tie rods are secured in position between the lugs formed on the gusset plates. The next tier of column sections is then superimposed and fastened to the gusset plates 11 carried by the lower sections, and the deck bars and tie rods for such tier are secured in place, and so on with the balance of the structure. By this arrangement it will be seen that each tier is self-supporting, so that the whole structure can be simply and rapidly put up. At the same time the sections of the columns are maintained in alignment since the gusset plates in effect constitute a sleeve embracing the top end of the lower column and the lower end of the upper column and connected to both columns. This splice also gives a good bearing and connection between the sections so that the loads of an upper tier are properly distributed over a lower tier. It will also be noted that the deck flooring and the tie bars are held rigidly at right angles to the line of the columns and in the median planes thereof so that no twisting strains are imposed upon the columns. Furthermore the position of the columns is fixed both transversely and longitudinally of the ranges by the deck bars and the tie rods respectively, exactly at the joint between the sections.

By the foregoing arrangement it is possible to erect a book stack which will stand independent of the bracing that is generally afforded by the surrounding walls of the stack room, or else by diagonal rods extending through the stack compartments. Such intrinsic stability of the stack is an advantage of importance both in the erection of the building and also in its stability after erection, and in addition allows tall, thin walls to be tied together and braced by the stack construction without the sacrifice of the book space that is necessitated by the use of diagonal tie rods. Furthermore the construction of supporting columns and splices for the joints therefor, and the arrangement of the deck bars and tie rods, while such as to lend stability to the structure, nevertheless is inherently elastic to external stresses so that the structure will resist earthquake shocks without impairment.

This elasticity of the structure is due not merely to the absence of diagonal tie-rods, but also to the latent elasticity of sheet metal columns 7, 7ᵃ, 7ᵇ and gusset plates 11 themselves, owing to their bent up formation as here illustrated and described. In the particular construction here shown, it will be seen, the parts are so secured together as to develop their latent elasticity very effectively upon occasion, since the gusset plates 11 do not interfere materially with the elastic action of the columns 7, 7ᵃ, 7ᵇ, or vice-versa. For example, if (see Figs. 3 and 5) considerable longitudinal stress is brought to bear on a stack range A, it can be taken up by deflection of the range through elastic distortion (bending or twisting) in the gussets 11, owing to the relative remoteness of the bolts 12 that attach the gussets to the column flanges 9 from the bolts 17 that attach the longitudinal ties E to the gussets,—to say nothing of ultimate relative movement of the parts about the bolts 17 themselves. Or if, again, transverse stress is brought to bear along a deck beam C, then the gussets 11 and the long sides of the quadrangular columns 7, 7ᵃ, 7ᵇ that carry the flanges 9 can yield elastically by bending inward. Such elastic actions could not, of course, take place so readily and freely if the column 7, 7ᵃ, 7ᵇ were also provided with longitudinal flanges 9 on its other two sides, and the gussets 11 with corresponding flanges bolted to such additional column flanges inside of the lugs 14.

It will be observed that the lugs 13 and 14 are narrower than the column-engaging portions of the gussets 11 lengthwise of the columns, so that the horizontal bracing members C, E can be aligned with the actual junction of the abutting column sections 7, 7ᵃ, 7ᵇ without interference from the horizontal flanges of such members C, E. As shown, the upper edges of the lugs 14 for the longitudinal ties E are below those of the lugs 13 for the transverse deck beams C, whose top flanges are thus correspondingly above those of the ties. This relation of ties and deck beams is particularly advantageous in library stack construction, for reasons that will be obvious to those skilled in the art, minimizing interferences of the stack structure with the space available for books.

In general, the construction is compact, neat, light in weight, simple and economical.

We claim:

1. A column unit for library stack construction comprising an elastic sheet metal column section proper, and elastic bent up quadrant gusset plates embracing and extending beyond the end of said column section so as to serve for aligning therewith and securing thereto the abutting end of an adjacent section, said gussets having bracket flanges or lugs at opposite sides of the column section projecting laterally therefrom for the attachment of horizontal bracing members, and being secured to the column section only at points remote from said lugs.

2. A column unit for library stack construction comprising an elastic sheet metal column section with longitudinal flanges projecting from two opposite sides, and elastic bent up gusset plates embracing one end of said column section and having flanges projecting laterally at opposite sides of said column flanges and endwise beyond them, so as to overlap the corresponding flanges of an abutting column section, each of said gussets being secured to the column section only at the aforesaid two column flanges, and having bracket flanges or lugs at right angles to one another projecting laterally from said column section, for the attachment of deck-beam and tie-rod members.

3. A column unit for library stack construction comprising a column section proper, and bent up quadrant gusset plates secured about and extending beyond one end of said column section so as to serve for aligning therewith and securing thereto the abutting end of an adjacent section, said gussets having bracket flanges or lugs for the attachment of deck beams projecting laterally from opposite sides of the column section, and other lugs for the attachment of horizontal tie rods projecting from the other sides of the column, below said deck beam lugs.

4. A bookstack comprising in combination a plurality of vertical supporting columns each composed of superposed elastic sheet metal sections, splices for the column joints each comprising a plurality of elastic bent up gusset plates overlapping adjacent ends of the sections and having lugs projecting from the column, and horizontal members interconnecting adjacent columns and attached to said lugs, the stack being elastic to external stresses by virtue of the elasticity and interrelation of the parts, and yet intrinsically strong and stable without necessity for diagonal tie-rods.

5. A bookstack comprising in combination a plurality of vertical supporting columns each composed of superposed elastic quadrangular hollow sections, splices for the column joints each comprising a plurality of bent formed gusset plates overlapping adjacent ends of the sections and secured to their sides, and having lugs projecting from the sides of the column, and horizontal members interconnecting adjacent columns and attached to said lugs, the stack thus being elastic to external stresses by virtue of the elasticity of the column sides and the interrelation of the parts, and yet intrinsically strong and stable without necessity for diagonal tie-rods.

6. A book stack range inherently self-supporting independently of the library building structure, and elastically yielding to extrinsic stresses, said range comprising vertical supporting columns each composed of superposed column sections; a plurality of elastic bent up quadrant gusset plates about the abutting ends of the column sections serving to maintain them in alignment, each of said gussets having bracket flanges or lugs projecting from the column toward adjacent columns of the range, and also at right angles to the range; and tie rods extending from column to column in the range secured to the first mentioned bracket lugs of said gussets; and said gussets being secured to the column sections by their other bracket lugs only, so as to make the range relatively elastic in the direction of its length by virtue of the elasticity of the gussets.

In testimony whereof, we have hereunto signed our names.

HARRY P. MACDONALD.
ANGUS S. MACDONALD.